US010272719B2

(12) United States Patent
Asai (10) Patent No.: US 10,272,719 B2
(45) Date of Patent: Apr. 30, 2019

(54) UNIVERSAL CASTER

(71) Applicant: TAIKOH CO., LTD., Toyota-shi (JP)

(72) Inventor: Yasuharu Asai, Toyota (JP)

(73) Assignee: TAIKOH CO., LTD. (JP)

( * ) Notice: Subject to any disclaimer, the term of this patent is extended or adjusted under 35 U.S.C. 154(b) by 0 days.

(21) Appl. No.: 15/129,056

(22) PCT Filed: Feb. 19, 2016

(86) PCT No.: PCT/JP2016/054829
§ 371 (c)(1),
(2) Date: Sep. 26, 2016

(87) PCT Pub. No.: WO2016/136608
PCT Pub. Date: Sep. 1, 2016

(65) Prior Publication Data
US 2018/0170101 A1     Jun. 21, 2018

(30) Foreign Application Priority Data

Feb. 26, 2015 (JP) ................. 2015-036630

(51) Int. Cl.
*A47B 91/00* (2006.01)
*B60B 33/00* (2006.01)
(Continued)

(52) U.S. Cl.
CPC ............ *B60B 33/0002* (2013.01); *B60B 9/06* (2013.01); *B60B 9/26* (2013.01); *B60B 33/0028* (2013.01);
(Continued)

(58) Field of Classification Search
CPC . Y10T 16/184; Y10T 16/212; Y10T 16/1857; Y10T 16/186; Y10T 16/1867;
(Continued)

(56) References Cited

U.S. PATENT DOCUMENTS 2,175,516 A * 10/1939 Bugatti .................... B60G 3/01
267/272
2,180,060 A * 11/1939 Kenyon .................. A47L 11/33
15/41.1
(Continued)

FOREIGN PATENT DOCUMENTS

JP        S4821818 Y1     6/1973
JP        S58-188304     12/1983
(Continued)

OTHER PUBLICATIONS

International Search Report PCT/JP2016/054829; International Filing Date: Feb. 19, 2016; 2 Pgs.

*Primary Examiner* — Chuck Y Mah
(74) *Attorney, Agent, or Firm* — Schmeiser, Olsen & Watts, LLP (57) ABSTRACT

A universal caster is provided that, with a hand truck, for loading and transporting a heavy substance. The universal caster includes a lower stage turning part A being mounted to an upper stage supporting shaft in the upper stage turning part B, thereby being made turnable with respect to the upper stage turning part; and a universal metal fitting that pivotally supports a wheel, being mounted to a lower stage supporting shaft in the lower stage turning part, thereby being made turnable with respect to the lower stage turning part, the lower stage supporting shaft being disposed in a displaced manner in a horizontal direction from the upper stage supporting shaft, and the wheel being supported by the wheel shaft through one or a plurality of rows of spiral springs.

6 Claims, 7 Drawing Sheets

(51) Int. Cl.
*B60B 33/02* (2006.01)
*B60B 9/06* (2006.01)
*B60B 9/26* (2006.01)

(52) U.S. Cl.
CPC ...... *B60B 33/0039* (2013.01); *B60B 33/0047* (2013.01); *B60B 33/02* (2013.01); *B60B 33/0036* (2013.01)

(58) Field of Classification Search
CPC ..... Y10T 16/196; B60B 33/002; B60B 33/00; B60B 33/0039; B60B 33/0047; B60B 33/0057; B60B 33/045; B60B 9/06; B60B 9/005; B60G 11/00; B60G 11/14; B60G 11/15; B60G 11/16; B60G 11/006; B60G 3/01
See application file for complete search history.

(56) References Cited

U.S. PATENT DOCUMENTS

| | | | | |
|---|---|---|---|---|
| 2,377,232 | A * | 5/1945 | Walter | B60B 9/005 16/44 |
| 2,443,900 | A * | 6/1948 | Evans | B60G 11/15 16/44 |
| 2,541,514 | A * | 2/1951 | Herold | B60B 33/0002 104/306 |
| 2,544,924 | A * | 3/1951 | Herold | B60B 33/0028 104/306 |
| 2,683,033 | A * | 7/1954 | Ashburn | B60G 11/15 16/44 |
| 2,721,766 | A * | 10/1955 | Kramcsak, Jr. | B60B 33/045 16/44 |
| 3,349,425 | A * | 10/1967 | Reabelos | A47B 91/04 16/44 |
| 4,342,134 | A * | 8/1982 | Mickelson | B60B 33/0002 16/31 R |
| 4,633,544 | A * | 1/1987 | Hicks | B60B 33/0028 16/35 R |
| 6,880,203 | B1 * | 4/2005 | Aubin | B60B 33/0028 16/31 R |
| 7,810,533 | B2 * | 10/2010 | Wichern | B60B 9/06 152/87 |
| 9,051,965 | B1 * | 6/2015 | Spektor | F16C 19/505 |
| 2006/0075600 | A1 * | 4/2006 | Dominic | B60B 33/0002 16/32 |
| 2010/0072807 | A1 * | 3/2010 | Wichem | B60B 9/06 301/54 |
| 2010/0247281 | A1 * | 9/2010 | Kempf | B60B 33/0039 414/800 |
| 2012/0042472 | A1 * | 2/2012 | Aubin | B60B 33/0015 16/46 |
| 2013/0104337 | A1 * | 5/2013 | Nabb | B60B 33/0026 16/30 |

FOREIGN PATENT DOCUMENTS

| | | |
|---|---|---|
| JP | H11222003 A | 8/1999 |
| JP | 2007331554 A | 12/2007 |
| JP | 2010-12910 A | 6/2010 |
| JP | 2013126852 A | 6/2013 |
| JP | 2013151287 A | 8/2013 |
| JP | 2015167648 A | 9/2015 |

* cited by examiner

UNIVERSAL CASTER

CROSS-REFERENCE TO RELATED APPLICATIONS

This application claims priority to PCT Application No. PCT/JP2016/054829, having a filing date of Feb. 19, 2016, based off of Japanese Application No. 2015-036630 having a filing date of Feb. 26, 2015, the entire contents of which are hereby incorporated by reference.

FIELD OF TECHNOLOGY

The following relates to a universal caster, and more particularly, a universal caster that is suitable for use with a traveling body, such as a hand truck, a shopping cart, or a movable chair, especially a traveling body to be used for transportation of a heavy substance.

BACKGROUND

The universal caster is disposed at a leg of a traveling body, such as a hand truck, a shopping cart, or a movable chair, thereby facilitating advancing and retracting of the traveling body, and in addition, freely turns in response to a change in orientation of the traveling body, thereby providing a function to allow a smooth traveling with the orientation of the traveling body being changed. Generally, the universal caster is comprised of a fixing plate that is fixed to the bottom face of a hand truck, or the like, a universal metal fitting that is disposed on the fixing plate through a bearing device, and a wheel that is pivotally supported by the universal metal fitting.

For a general traveling body, such as the hand truck, the shopping cart, or the movable chair, the above-mentioned conventional universal caster will cause no problem in particular. However, for example, in the case of a hand truck for loading and transporting a heavy substance, like a hand truck for use in a vehicle assembling plant, an iron wok, and the like, a significantly large weight load is imposed on each universal caster for the hand truck, and thus a large force is required especially at the time of initial operation or at the time of traveling over a step. In addition, since the load that is imposed on each universal caster is not always uniform, a partial distortion tends to be produced in the universal caster, thereby generating a possible obstacle for free turning of the universal caster.

As described above, conventionally, with a hand truck, and the like, for loading and transporting a heavy substance, a significantly large weight load has been imposed on each universal caster, thereby not only a large force having been required at the time of initial operation or at the time of traveling over a step, but also a partial distortion having tended to be produced in the universal caster, thereby having generated a possible obstacle for free turning of the universal caster. Embodiments of the present invention have been made to solve such a problem, and is intended to provide a universal caster that, with a hand truck, and the like, for loading and transporting a heavy substance, decreases the load at the time of initial operation or at the time of traveling over a step, allowing traveling without effort, and eliminating the possibility that an obstacle for free turning of the universal caster may be generated.

SUMMARY

An aspect relates to a universal caster, including:
turning parts at upper and lower two stages, the lower stage turning part being mounted to an upper stage supporting shaft in the upper stage turning part, thereby being made turnable with respect to the upper stage turning part, and a universal metal fitting that pivotally supports a wheel, being mounted to a lower stage supporting shaft in the lower stage turning part, thereby being made turnable with respect to the lower stage turning part, the lower stage supporting shaft being disposed in a displaced manner in a horizontal direction from the upper stage supporting shaft, and being disposed in a displaced manner in a horizontal direction from a vertical line passing through a wheel shaft of the universal metal fitting, and the wheel being supported by the wheel shaft through one row of spiral spring or a plurality of rows of spiral springs.

In one embodiment, the spiral spring is loaded between the outer circumferential surface of a shaft cylinder that is rotatably disposed through bearings disposed in a portion located inside of the universal metal fitting for the wheel shaft, and the inner circumferential surface of the wheel. In that case, the starting end part of the spiral spring is engageably inserted into a recessed part formed in the shaft cylinder to be supported by the shaft cylinder, while the terminating end part of the spiral spring is engageably inserted into a recessed part formed in the inner circumferential surface of the wheel to be supported by the wheel.

In another embodiment, the spiral spring is loaded between the outer circumferential surface of a rotary barrel that is fixed to the wheel shaft pivotally supported by bearings disposed on the outside faces of the universal metal fitting, and the inner circumferential surface of the wheel. In that case, the starting end part of the spiral spring is engageably inserted into a recessed part formed in the rotary barrel to be supported by the rotary barrel, while the terminating end part of the spiral spring is engageably inserted into a recessed part formed in the inner circumferential surface of the wheel to be supported by the wheel.

In one embodiment, bolt fastening holes for bolting the universal caster to a hand truck or any other traveling body that are provided at the four corners of an upper stage fixing plate which is located at top of the upper stage turning part are elongated holes in the shape of a modified letter L.

Advantages

According to embodiments of the present invention, as described above, the wheel is configured to be mounted to the wheel shaft through one row of spiral spring or a plurality of spiral springs, and thus a forward or rearward motion and a diagonal motion of the wheel will not be directly transmitted to the wheel shaft; therefore, even if the wheel makes an irregular motion in, for example, traveling over a step, or the like, the wheel shaft can hold the horizontal state without being influenced by the irregular motion, whereby the hand truck, or the like, to which the present universal caster is mounted, can be stably traveled. Moreover, at the time of starting, the resilient force of one row of spiral spring or those of a plurality of spiral springs act(s) on the wheel, thereby providing an effect that the hand truck, or the like, can be started with a light touch.

In addition, with a hand truck, or the like, that is loaded with a heavy substance for transportation, assuming that a significantly large weight load is imposed on each universal caster, the free turning operations that are made at the upper and lower two stages in traveling and turning are mutually independent, thereby providing an effect that there is no possibility of an obstacle for free turning of each universal caster being generated.

BRIEF DESCRIPTION

Some of the embodiments will be described in detail, with reference to the following figures, wherein like designations denote like members, wherein.

DETAILED DESCRIPTION

Figure 1:
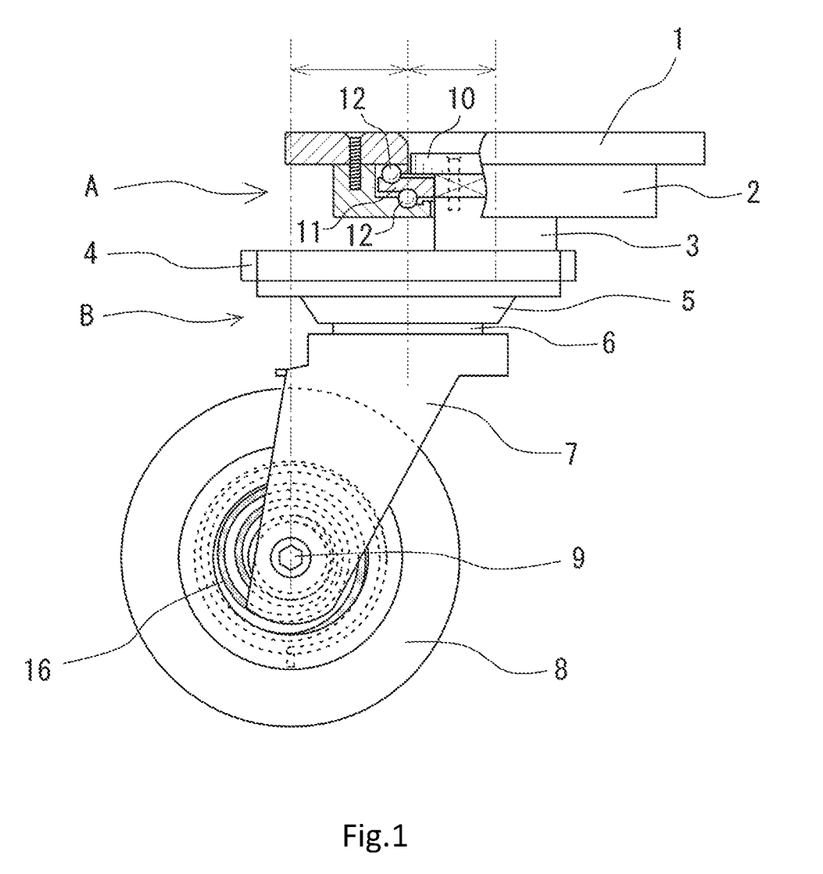
FIG. 1 is a partial sectional side view of a universal caster of a first embodiment in accordance with the present invention.
Figure 2:
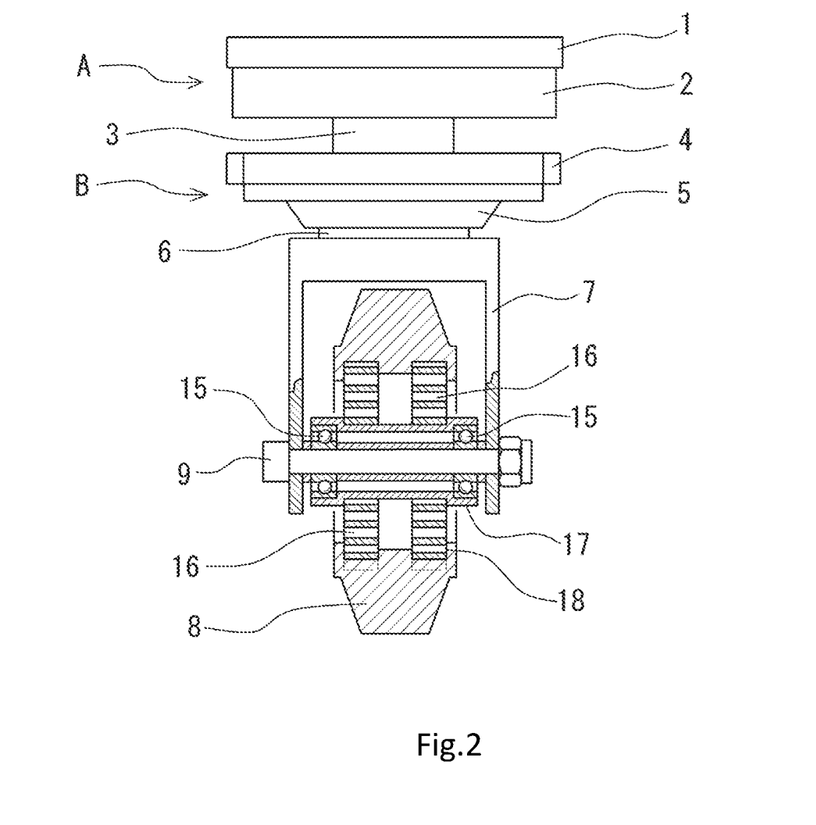
FIG. 2 is a partial sectional front view of the universal caster of the first embodiment in accordance with the present invention.

Hereinbelow, embodiments of the present invention will be explained with reference to the attached drawings. FIG. 1 is a partial sectional side view of a universal caster of a first embodiment in accordance with embodiments of the present invention, and FIG. 2 is a partial sectional front view thereof. As shown in the figures, the universal caster in accordance with embodiments of the present invention has turning parts A and B at upper and lower two stages, and as can be seen from FIG. 1, an upper stage supporting shaft 3 in the upper stage turning part A and a lower stage supporting shaft 6 in the lower stage turning part B are disposed such that they are displaced from each other. In addition, the lower stage supporting shaft 6 is disposed in a displaced manner in a horizontal direction from a vertical line passing through a wheel shaft 9 for a universal metal fitting 7 that is mounted to the lower stage supporting shaft 6.

The upper stage turning part A is comprised of an upper stage fixing plate 1 that is fixed to a bottom face of a traveling body, such as a hand truck; an upper stage shaft supporting case 2 that is fixed to the upper stage fixing plate 1 on the lower side thereof by screw fastening; an upper stage supporting shaft 3 that is rotatably supported in the upper stage shaft supporting case 2; and a rotating plate 4 that is fixed to the lower end of the upper stage supporting shaft 3. In addition, the lower stage turning part B is comprised of a lower stage shaft supporting case 5 that is disposed on the rear face of the rotating plate 4; a lower stage supporting shaft 6 that is rotatably supported in the lower stage shaft supporting case 5; and a universal metal fitting 7 formed in a bifurcated shape that is mounted to the lower stage supporting shaft 6, and in the lower end part of the universal metal fitting 7, a wheel 8 is pivotally supported. Examples of specific configuration of the upper stage turning part A and the lower stage turning part B will be later described.

With a general universal caster, the wheel shaft that is fixed to the universal metal fitting is configured to be inserted into a bearing that is fitted to the central part of the wheel, thereby the vibration of the wheel being transmitted to the universal metal fitting as it is through the wheel shaft. However, with the universal caster in accordance with embodiments of the present invention, the wheel 8 is configured to be separated from the wheel shaft 9 that is fixed to the universal metal fitting 7.

In other words, in an example shown in FIG. 2, there is provided a configuration in which the shaft cylinder 17 is rotatably disposed on the wheel shaft 9 through a pair of bearings 15, and the wheel 8 is disposed on the shaft cylinder 17 through two rows of spiral springs 16. In the example shown, the spiral spring 16 is provided in two rows, but may be in a single row or in three rows or more. The starting end part of the spiral spring 16 is, for example, engageably inserted into a recessed part that is formed in the outer circumferential surface of the shaft cylinder 17, while the terminating end part thereof is engageably inserted into a recessed part 18 that is formed in the inner circumferential surface of the wheel 8, thereby the spiral spring 16 being held in a stable state with no lateral displacement being caused.

In this way, the wheel 8 is configured to be mounted to the shaft cylinder 17 that is pivotally supported by the wheel shaft 9, through the spiral spring 16, thereby the motion of the wheel 8 and the motion of the wheel shaft 9 being separated from each other, and thus it can be the that the wheel 8 is supported by the shaft cylinder 17 in a floating state. In other words, a motion, such as a forward or rearward motion, or a diagonal motion, of the wheel 8 is transmitted to the wheel shaft 9 with the spiral spring 16 functioning as a cushion, and will not be directly transmitted to the wheel shaft 9. Therefore, even if, in such an occasion as that of traveling over a step, the wheel 8 is subjected to an impact, is inclined, or makes an irregular motion, the wheel shaft 9 holds a horizontal state without following such an event, whereby the hand truck, or the like, to which the present universal caster is mounted can be traveled in a smooth and stable manner. As in one aspect of the embodiments of the present invention, by providing the spiral spring 16 in a plurality of rows, the cushioning effect is enhanced.

In addition, if a heavy substance is placed on the hand truck, the portion of each spiral spring 16 that is located on the lower side of the shaft cylinder 17 is pressed through the universal metal fitting 7, the wheel shaft 9 and the shaft cylinder 17, thererby the resilient force in that portion being increased. Since such resilient force acts so as to push up the shaft cylinder 17 from the lower side, thus providing an assisting force at the time of, for example, starting the hand truck. Thus, the hand truck can be started with a light touch. In addition, also in an advancing or retracting operation of the hand truck that is to be made thereafter, the resilient force that pushes up the shaft cylinder 17 from the lower side is successively generated, whereby the advancing or retracting operation of the hand truck can be made with ease.

Further, the wheel 8 is supported by the shaft cylinder 17 in a floating state, and thus even if a large impact is imposed on the wheel 8 at the time of, for example, passing over a step, such impact is absorbed by the spiral spring 16 to a certain degree, thereby the large impact being not transmitted to the hand truck as it is. Therefore, there will not be caused such an event as that the hand truck is subjected to a large impact, thereby a substance loaded on the hand truck being damaged or displaced.

In addition, with the present universal caster, the lower stage turning part B is freely turned in a horizontal direction with respect to the upper stage turning part A through the upper stage supporting shaft 3, while the universal metal fitting 7 that pivotally supports the wheel 8 is freely turned in a horizontal direction through the lower stage supporting shaft 6. Therefore, in the case where this universal caster is used with a traveling body, such as a hand truck, on which a heavy substance is loaded for transportation, even if a load of a significantly large weight is imposed on each universal caster, the upper and lower stages can be freely turned relative to each other, and the universal metal fitting 7 that pivotally supports the wheel 8 can change its orientation along a moving direction of the hand truck without effort, whereby, even at the time of loading and transporting a heavy substance, straight traveling, diagonal traveling, turning, or the like, of the hand truck can be smoothly performed with no hindrance, the need for exerting a large force being eliminated.

In addition, as described above, between the inner circumferential surface of the wheel 8 and the outer circumferential surface of the shaft cylinder 17, one row of spiral spring 16 or a plurality of rows of spiral springs 16 is (are) loaded, and therefore, even when the universal caster is subjected to a heavy weight load, the resilient force of the one row of spiral spring 16 or those of the plurality of rows of spiral springs 16 act(s) as an assisting force(s), facilitating not only a traveling operation at the time of initial traveling or traveling over a step, but also a general traveling operation, such as that for advance, retract, or turn.

Figure 3:
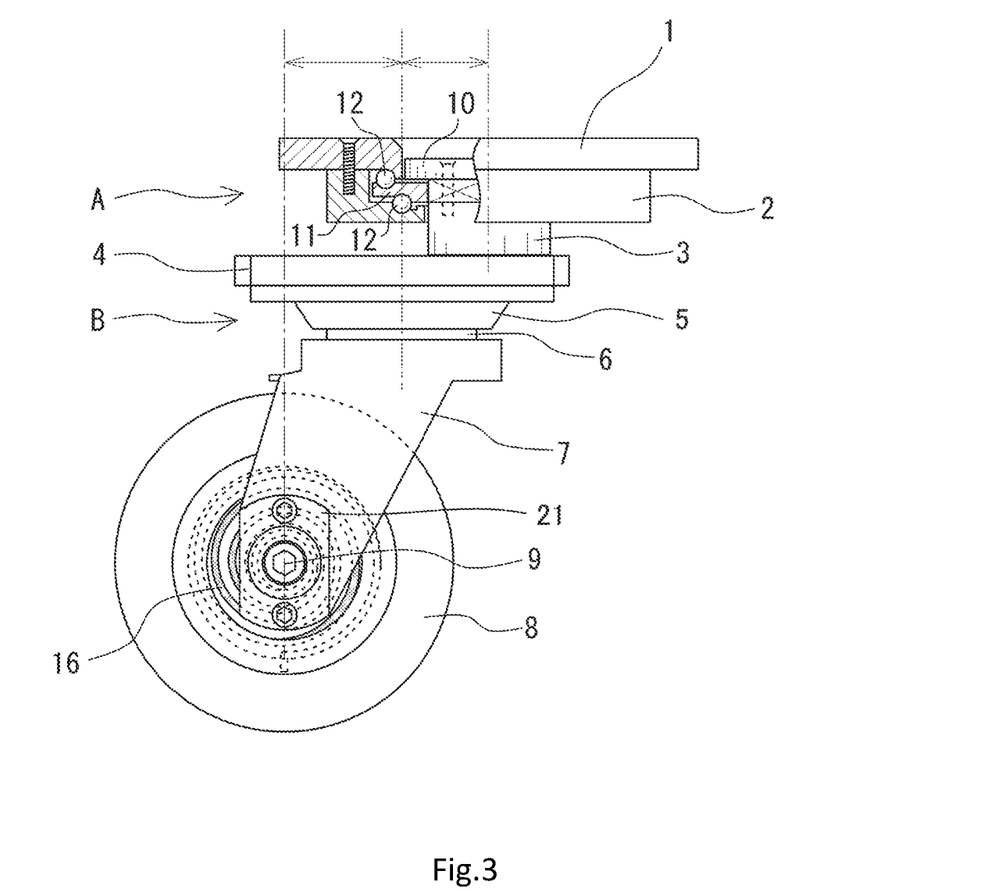
FIG. 3 is a partial sectional side view of a universal caster of a second embodiment in accordance with the present invention.
Figure 4:
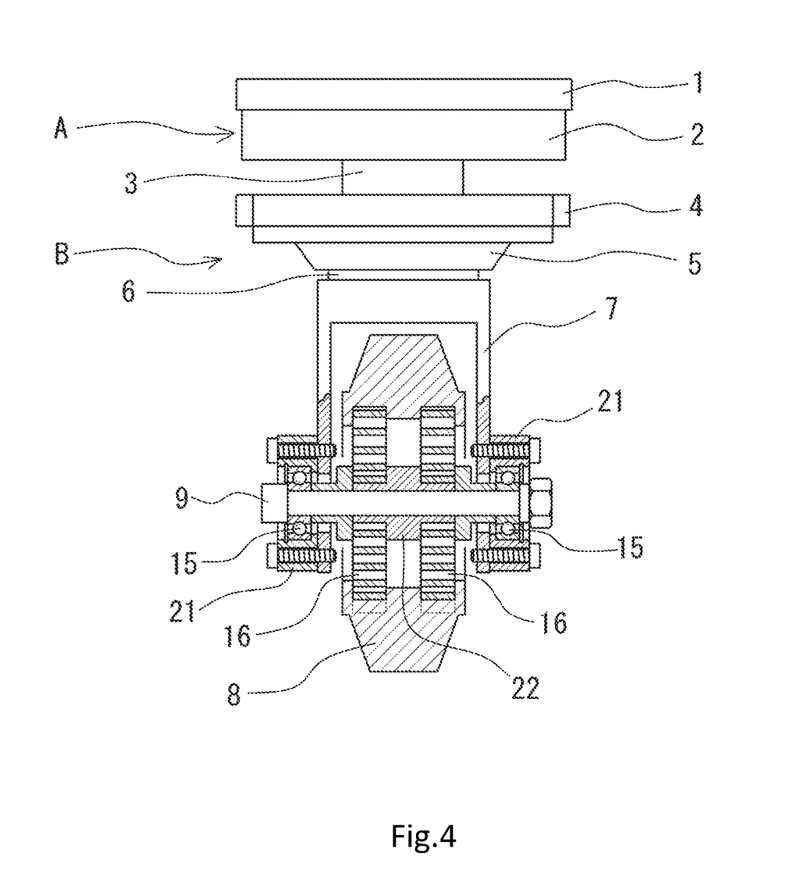
FIG. 4 is a partial sectional front view of the universal caster of the second embodiment in accordance with the present invention.

Next, a second embodiment as illustrated in FIG. 3 and FIG. 4 will be explained. This second embodiment differs from the first embodiment in the point of location where the bearing 15 is disposed. In other words, the bearing 15 in the first embodiment is disposed inside of the universal metal fitting 7, however, the bearing 15 in the second embodiment is disposed outside of the universal metal fitting 7. In the second embodiment, the bearing 15 is held by the bearing case 21 that is fixed to the outside face of the universal metal fitting 7, the wheel shaft 9 being fitted into the inner ring of the bearing 15. Therefore, the wheel shaft 9 in the second embodiment is rotatable. To the wheel shaft 9, a rotary barrel 22 is fixed, and between the rotary barrel 22 and the inner circumferential surface of the wheel 8, one row of spiral spring 16 or a plurality of rows of spiral springs 16 is (are) loaded in the same manner as in the first embodiment.

In this second embodiment, the rotation of the wheel 8 is transmitted to the rotary barrel 22 and the wheel shaft 9 through the spiral spring 16, thereby the wheel 8, the spiral spring 16, the rotary barrel 22 and the wheel shaft 9 being integrally rotated, however, the rotation of the wheel 8 is not directly transmitted to the rotary barrel 22 and the wheel shaft 9, but is transmitted through the spiral spring 16. Therefore, the resilient force and the cushioning effect of the spiral spring 16 facilitate not only a traveling operation at the time of initial traveling or traveling over a step, but also a general traveling operation, such as that for advance, retract, or turn in the same manner as in the first embodiment. In addition, the lower stage turning part B is freely turned in a horizontal direction with respect to the upper stage turning part A through the upper stage supporting shaft 3, while the universal metal fitting 7 that pivotally supports the wheel 8 is freely turned in a horizontal direction through the lower stage supporting shaft 6, facilitating a general traveling operation, such as that for advance, retract, or turn in the same manner as in the first embodiment.

Next, examples of configuration of the upper stage turning part A and the lower stage turning part B will be explained. The cutaway views in FIG. 1 and FIG. 3 show an example of internal configuration of the upper stage shaft supporting case 2 for pivotally supporting the upper stage supporting shaft 3, and in the case of this example, at the upper end of the upper stage supporting shaft 3, a rotating plate 11 that is freely rotated in the upper stage shaft supporting case 2 is fixed, being pressed and held by a top plate 10, with an annular groove that holds a number of steel balls 12 in a rotatable manner being formed in the peripheral edge part of the rotating plate 11 on the top face side and the bottom face side thereof. In addition, in the rear face of the upper stage fixing plate 1 and in the internal bottom face of the upper stage shaft supporting case 2, respectively, a means for holding the steel ball 12, such as a groove, is provided. In this way, the top plate 10, the rotating plate 11, the upper stage supporting shaft 3 and the rotating plate 4 are made integrally rotatable, being supported by the upper stage shaft supporting case 2. The lower stage turning part B may also be provided with a configuration according to the upper stage turning part A.

Figure 5:
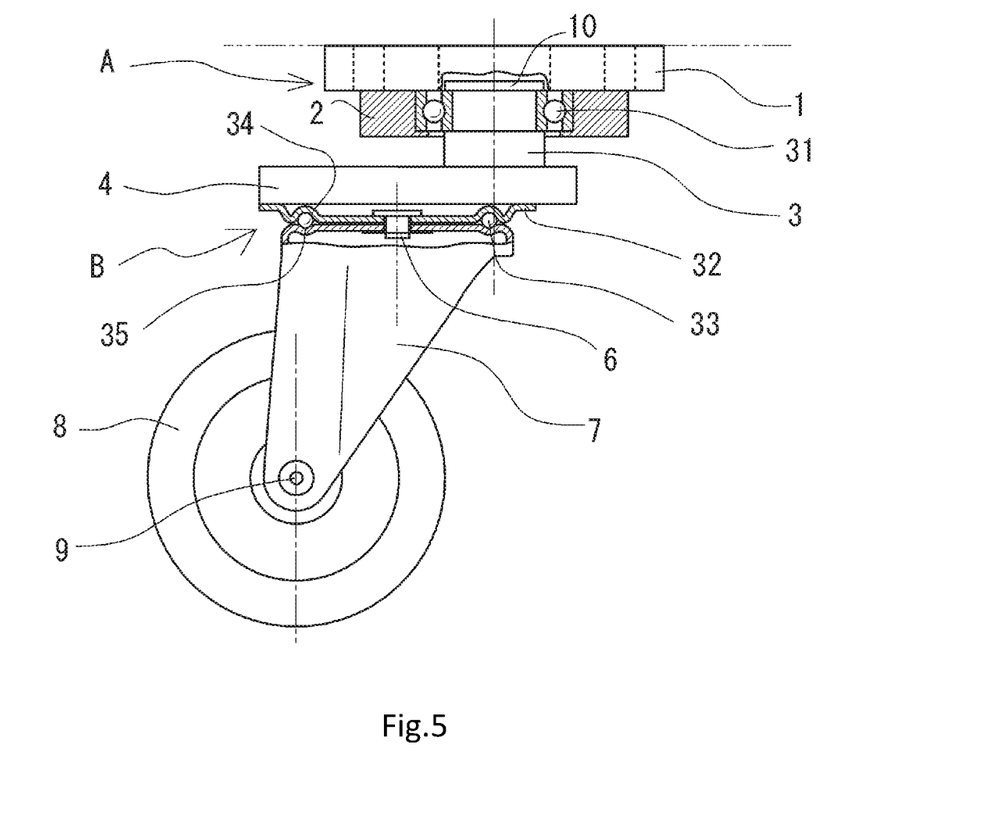
FIG. 5 is a partial sectional front view illustrating an example of configuration of an upper stage turning part and a lower stage turning part of the universal caster in accordance with the present invention.

In an example shown in FIG. 5, the upper stage supporting shaft 3 in the upper stage turning part A is adapted to be pivotally supported with a radial ball bearing 31, and the lower stage turning part B is configured to have a thinner structure. In other words, with the lower stage turning part B, a ball supporting plate 32 is fixed to the rear face of the rotating plate 4, and between the ball supporting plate 32 and the top face of the universal metal fitting 7, a number of steel balls 33 are disposed. In this case, in the rear face of the ball supporting plate 32, an annular groove 34 is formed that accommodates the upper portion of the steel ball 33, and in the top face of the universal metal fitting 7, there is formed an annular groove 35 for accommodating the lower portion of the steel ball 33 that corresponds to the annular groove 34. In addition, the head part of the lower stage supporting shaft 6 is made flat so as to be accommodated in a space part that is formed between the rotating plate 4 and the ball supporting plate 32 by the annular groove 34 in the ball supporting plate 32. In FIG. 5, the spiral spring 16 is omitted to be shown.

Figure 6:
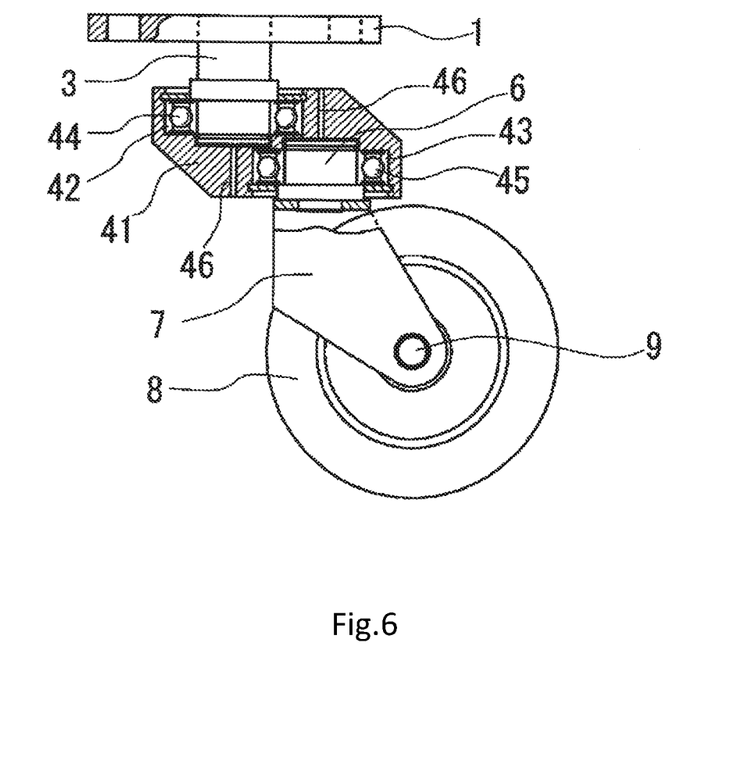
FIG. 6 is a partial sectional front view illustrating another example of configuration of an upper stage turning part and a lower stage turning part of the universal caster in accordance with the present invention.

In addition, in an example shown in FIG. 6, the respective pivotally supported portions of the upper stage supporting shaft 3 in the upper stage turning part A and the lower stage supporting shaft 6 in the lower stage turning part B are incorporated in a single bearing block 4, being displaced in a horizontal direction from each other. The bearing block 41 is made of a metal or a rigid plastic material, and in the top face and the bottom face, recessed parts 42 and 43 for incorporating a bearing are formed, being displaced in a horizontal direction from each other, with a bearing 44 for pivotally supporting the upper stage supporting shaft 3 being incorporated in the recessed part 42, while a bearing 45 for pivotally supporting the lower stage supporting shaft 6 being incorporated in the recessed part 43. In the bottom face of the respective recessed parts 42 and 43, an air bleeder hole 46 that is passed through to the opposite face is formed. This air bleeder hole 46 is provided in order to release an internal pressure that is produced when the upper stage supporting shaft 3 and the lower stage supporting shaft 6 are assembled with the bearings 44 and 45 in the bearing block 41.

The upper stage supporting shaft 3 in the example shown in FIG. 6 is fixed to the bottom face of a traveling body through the upper stage fixing plate 1, however, the upper end part of upper stage supporting shaft 3 may be threaded to directly screwed into the bottom face of the traveling body. Also in FIG. 6, the spiral spring 16 is omitted to be shown.

Figure 7:
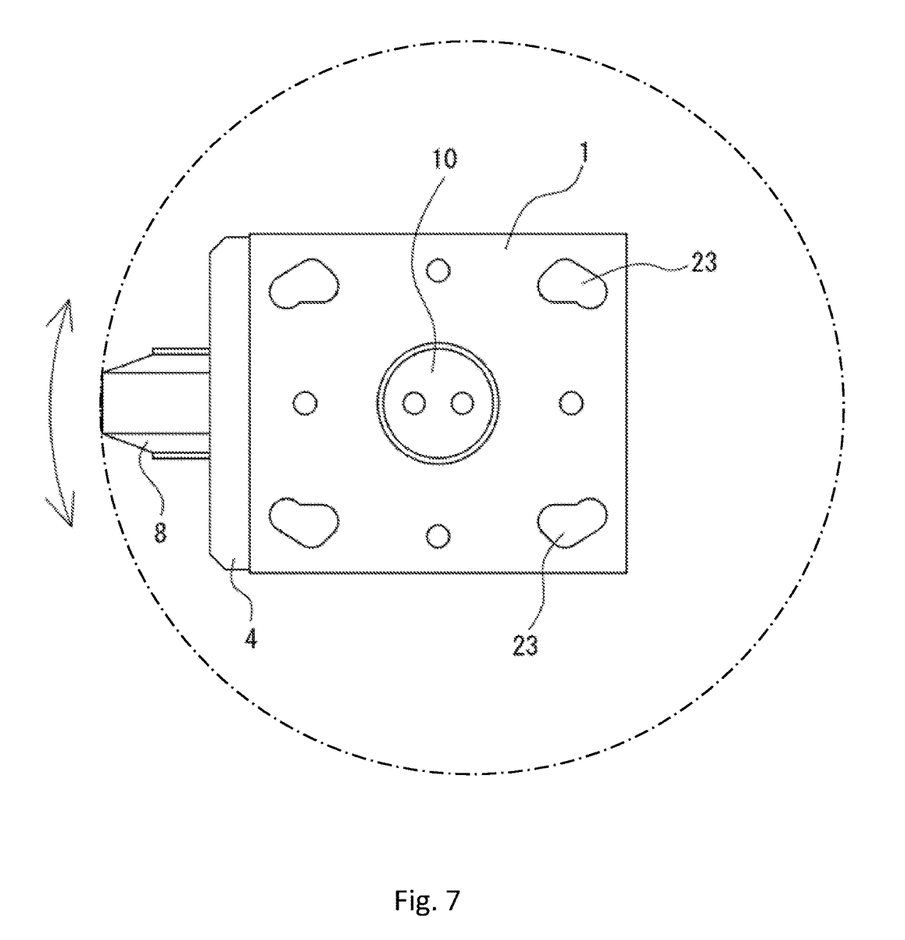
FIG. 7 is a top view illustrating an example of configuration of an upper stage fixing plate of the universal caster in accordance with the present invention.

The present universal caster is fixed to the rear face of a hand truck or any other traveling body by bolting it through a bolt insertion hole 23 that is formed in the upper stage fixing plate 1, however, the locations where bolt holes provided in the rear face of a traveling body, i.e., the lengthwise and crosswise distances between bolt hole centers are not definite, and therefore the bolt insertion hole 23 in embodiments of the present invention is formed as an elongated hole in the shape of a modified letter L as shown in FIG. 7 to provide versatility.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The claims are as follows:

1. A universal caster, comprising:

turning parts at upper and lower two stages, the lower stage turning part being mounted to an upper stage supporting shaft in the upper stage turning part, thereby being made turnable with respect to said upper stage turning part, and a universal metal fitting that pivotally supports a wheel, having a pair of bifurcated leg parts and being mounted to a lower stage supporting shaft in said lower stage turning part, thereby being made turnable with respect to said lower stage turning part, said lower stage supporting shaft being disposed in a displaced manner in a horizontal direction from said upper stage supporting shaft, and being disposed in a displaced manner in a horizontal direction from a vertical line passing through a wheel shaft of said universal metal fitting, and said wheel being supported by the wheel shaft through one row of spiral spring or a plurality of rows of spiral springs;

wherein said spiral spring is loaded between the outer circumferential surface of a shaft cylinder that is rotatably disposed through bearings disposed in a portion located inside of the pair of bifurcated leg parts of said universal metal fitting for said wheel shaft, and the inner circumferential surface of said wheel.

2. The universal caster according to claim 1, wherein a starting end part of said spiral spring is engageably inserted into a recessed part formed in said shaft cylinder to be supported by the shaft cylinder, while a terminating end part of said spiral spring is engageably inserted into a recessed part formed in the inner circumferential surface of said wheel to be supported by the wheel.

3. The universal caster according to claim 1, wherein bolt fastening holes for bolting the universal caster to a hand truck or any other traveling body that are provided at the four corners of an upper stage fixing plate which is located at top of said upper stage turning part are elongated holes in the shape of a modified letter L.

4. A universal caster, comprising:

turning parts at upper and lower two stages, the lower stage turning part being mounted to an upper stage supporting shaft in the upper stage turning part, thereby being made turnable with respect to said upper stage turning part, and a universal metal fitting that pivotally supports a wheel, having a pair of bifurcated leg parts and being mounted to a lower stage supporting shaft in said lower stage turning part, thereby being made turnable with respect to said lower stage turning part, said lower stage supporting shaft being disposed in a displaced manner in a horizontal direction from said upper stage supporting shaft, and being disposed in a displaced manner in a horizontal direction from a vertical line passing through a wheel shaft of said universal metal fitting, and said wheel being supported by the wheel shaft through one row of spiral spring or a plurality of rows of spiral springs, and said spiral spring is loaded between the outer circumferential surface of a rotary barrel that is fixed to said wheel shaft pivotally supported by bearings disposed on the outside faces of the pair of bifurcated leg parts of said universal metal fitting, and the inner circumferential surface of said wheel.

5. The universal caster according to claim 4, wherein a starting end part of said spiral spring is engageably inserted into a recessed part formed in said rotary barrel to be supported by the rotary barrel, while a terminating end part of said spiral spring is engageably inserted into a recessed part formed in the inner circumferential surface of said wheel to be supported by the wheel.

6. The universal caster according to claim 4, wherein bolt fastening holes for bolting the universal caster to a hand truck or any other traveling body that are provided at the four corners of an upper stage fixing plate which is located at top of said upper stage turning part are elongated holes in the shape of a modified letter L.

\* \* \* \* \*